United States Patent
Ammerman et al.

(10) Patent No.: US 9,879,900 B1
(45) Date of Patent: Jan. 30, 2018

(54) COLUMN CABINET CONSTRUCTION AND METHOD FOR DOOR CONSTRUCTION

(71) Applicant: WHIRLPOOL CORPORATION, Benton Harbor, MI (US)

(72) Inventors: Jason Ammerman, Chicago, IL (US); Byron Gerber, Roanoke, IL (US); Chad Rotter, Amana, IA (US); Dustin Schumacher, Washington, IL (US); John F. Wikoff, East Peoria, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/257,176

(22) Filed: Sep. 6, 2016

(51) Int. Cl.
| | |
|---|---|
| *A47B 96/04* | (2006.01) |
| *F25D 23/02* | (2006.01) |
| *F25D 23/04* | (2006.01) |
| *F25D 23/06* | (2006.01) |
| *F25D 11/02* | (2006.01) |
| *F25D 23/08* | (2006.01) |

(52) U.S. Cl.
CPC .............. *F25D 23/02* (2013.01); *F25D 11/02* (2013.01); *F25D 23/04* (2013.01); *F25D 23/066* (2013.01); *F25D 23/085* (2013.01); *F25D 2327/00* (2013.01); *F25D 2400/18* (2013.01)

(58) Field of Classification Search
CPC ........ F25D 23/02; F25D 23/04; F25D 23/066; F25D 23/085; F25D 11/02; F25D 2400/18; F25D 2327/00
See application file for complete search history.

(56) References Cited

U.S. PATENT DOCUMENTS

| | | | | |
|---|---|---|---|---|
| 2,662,660 A | * | 12/1953 | Frykdahl | F25D 23/085 220/592.06 |
| 2,873,041 A | * | 2/1959 | Allen | F25D 23/085 220/592.06 |
| 2,958,210 A | | 11/1960 | Rill, Jr. | |
| 2,995,649 A | * | 8/1961 | Cyrus | F25D 27/00 362/216 |
| 3,405,986 A | * | 10/1968 | Cannon | F25D 23/085 174/97 |
| 3,612,848 A | * | 10/1971 | Koch | A47B 96/04 312/223.5 |
| 3,629,972 A | * | 12/1971 | Rehberg | A47F 3/043 49/240 |

(Continued)

FOREIGN PATENT DOCUMENTS

| | | |
|---|---|---|
| WO | 2011026751 A2 | 3/2011 |
| WO | 2015014631 A1 | 2/2015 |

*Primary Examiner* — Hanh V Tran
(74) *Attorney, Agent, or Firm* — Price Heneveld LLP

(57) ABSTRACT

A refrigerated appliance having a cabinet defining at least one interior compartment, the cabinet having a metal inner liner, a framed thermal break member having four corner joinery elements coupled to four side thermal breaks, and a cabinet face plate. The refrigerated appliance also has a door coupled to the cabinet where the door has a framed profile having four corner joints coupled to four side profiles, an inner panel, two or more ladders, a gasket, and an outer door panel. The framed thermal break member is coupled to the metal liner and the cabinet face plate. The framed profile is coupled to the inner panel, two or more ladders, the gasket, and the outer door panel.

16 Claims, 17 Drawing Sheets

(56) References Cited

U.S. PATENT DOCUMENTS

| | | | | |
|---|---|---|---|---|
| 4,829,653 | A * | 5/1989 | Stich | F25D 23/04 29/458 |
| 5,048,233 | A * | 9/1991 | Gidseg | E06B 3/78 126/198 |
| 5,584,551 | A * | 12/1996 | Jenkins | F25D 23/064 312/21 |
| 5,720,536 | A * | 2/1998 | Jenkins | F25D 23/085 312/401 |
| 6,112,542 | A * | 9/2000 | Lee | F25D 17/08 62/407 |
| 6,178,763 | B1 * | 1/2001 | Brancheau | F25D 21/04 219/536 |
| 7,905,614 | B2 | 3/2011 | Aoki | |
| 8,104,853 | B2 | 1/2012 | Kim et al. | |
| 8,186,844 | B2 | 5/2012 | Hall | |
| 8,459,818 | B2 | 6/2013 | Becke et al. | |
| 8,701,374 | B2 * | 4/2014 | Becke | F25D 23/04 52/784.1 |
| 8,881,466 | B2 | 11/2014 | Roberts | |
| 2002/0021062 | A1 * | 2/2002 | Hodges | F25D 23/085 312/401 |
| 2008/0042537 | A1 * | 2/2008 | Kim | F25D 23/02 312/405 |
| 2008/0244869 | A1 * | 10/2008 | Bae | A47B 95/02 16/412 |
| 2009/0033190 | A1 * | 2/2009 | Becke | F25D 23/04 312/405.1 |
| 2010/0061079 | A1 * | 3/2010 | Li | F21V 33/0044 362/92 |
| 2010/0170279 | A1 * | 7/2010 | Aoki | F25D 11/02 62/264 |
| 2010/0219732 | A1 * | 9/2010 | Gorz | F25D 23/064 312/405 |
| 2010/0220460 | A1 * | 9/2010 | Hall | F25D 27/00 362/92 |
| 2012/0297690 | A1 * | 11/2012 | Roberts | F25D 23/02 49/504 |
| 2013/0003351 | A1 | 1/2013 | Wiedenmann | |
| 2013/0099650 | A1 | 4/2013 | Lee et al. | |
| 2013/0195543 | A1 * | 8/2013 | Mahat | F16B 12/06 403/267 |
| 2014/0208657 | A1 | 7/2014 | Kim et al. | |

* cited by examiner

COLUMN CABINET CONSTRUCTION AND METHOD FOR DOOR CONSTRUCTION

FIELD OF THE DISCLOSURE

The present disclosure generally relates to the construction of a refrigerator door and a refrigerator cabinet, and more specifically, the construction of an inner refrigerator door and an inner refrigeration cabinet.

BACKGROUND OF THE DISCLOSURE

The industry norm for producing a typical refrigerator door or a refrigerator cabinet is by thermoforming plastic to form the plastic breaker of the cabinet or the inner panel of the door. The aesthetics, finishes, and materials are limited with this conventional thermoforming method. A typical door liner will be configured with door dykes having a significant size and an impact on the aesthetics of the inner door appearance. In refrigeration cabinets, a breaker may be thought of as simply the region at the front of the liner which breaks the thermal conduction between the inside of the refrigeration cabinet and the ambient environment outside of the appliance. The problem with currently thermoformed plastic breakers includes limitations in achievable finishes, stress whitening of the material caused by assembly and processes such as foaming, and poor door gasket seal performance.

SUMMARY

According to one aspect of the present disclosure, a refrigerated appliance includes a cabinet defining at least one interior compartment. The cabinet has a metal inner liner, a framed thermal break member having four corner joinery elements coupled to four side thermal breaks, and a cabinet face plate. The refrigerated appliance further has a door coupled to the cabinet. The door includes a framed profile having four corner joints coupled to four side profiles, an inner panel, two or more ladders, a gasket, and an outer door panel. The framed thermal break member is coupled to the metal liner and the cabinet face plate. The framed profile is coupled to the inner panel, two or more ladders, the gasket, and the outer door panel.

According to another aspect of the present disclosure, a refrigerated appliance includes a cabinet defining at least one interior compartment and a door coupled to the cabinet. The door includes a framed profile having four corner joints coupled to four side profiles, an inner panel, two or more ladders, a gasket, and an outer door panel. The framed profile is coupled to the inner panel, two or more ladders, the gasket, and the outer door panel.

According to another aspect of the present disclosure, a refrigerated appliance includes a door and a cabinet defining at least one interior compartment. The cabinet includes a metal inner liner, a framed thermal break member having four corner joinery elements coupled to four side thermal breaks, and a cabinet face plate. The framed thermal break member is coupled to the metal liner and the cabinet face plate.

These and other features, advantages, and objects of the present device and method will be further understood and appreciated by those skilled in the art upon studying the following specification, claims, and appended drawings.

DETAILED DESCRIPTION OF EMBODIMENTS

Figure 1:
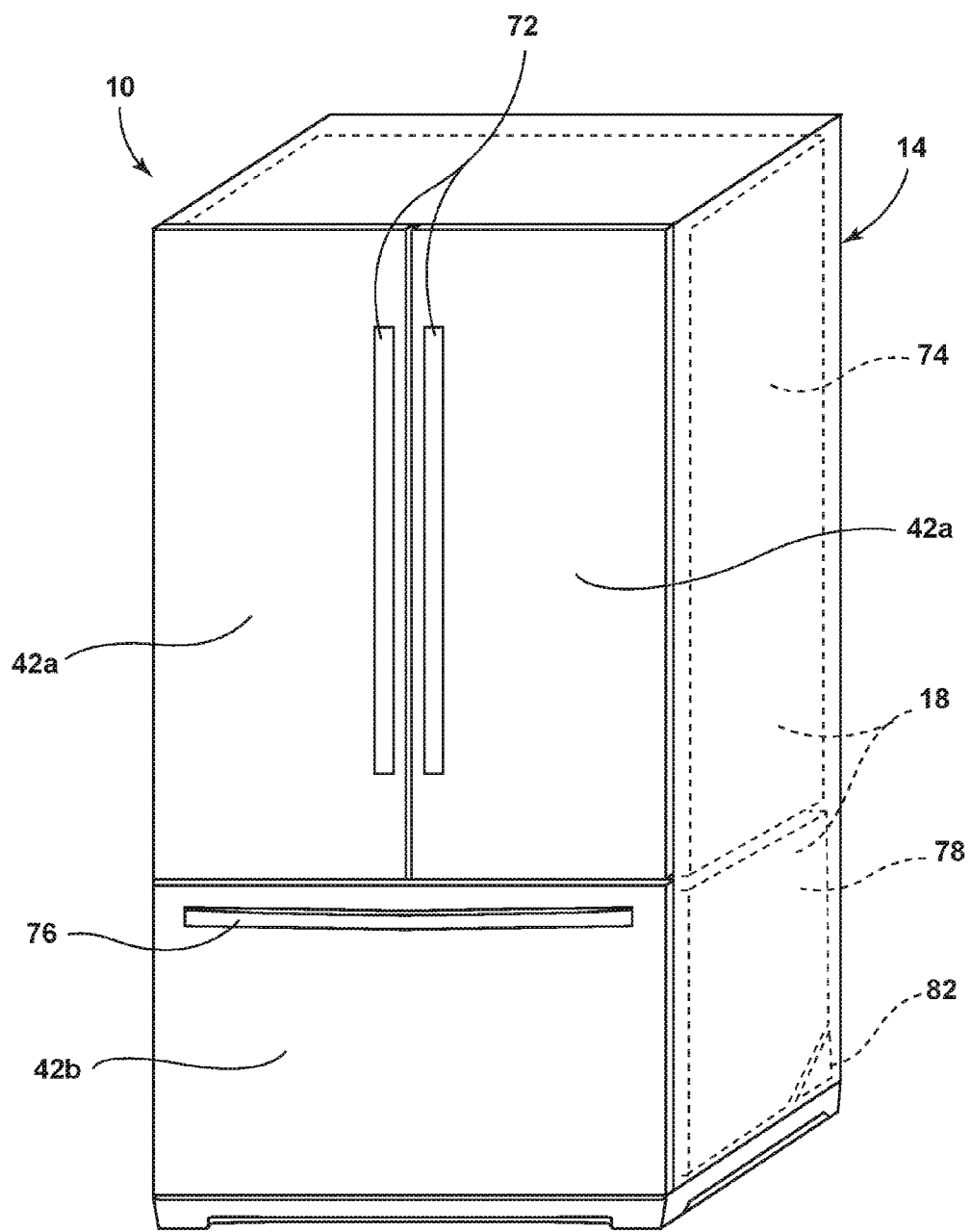
FIG. 1 is a front perspective view of a refrigerated appliance according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," wherein used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-18, the reference numeral 10 generally designates a refrigerated appliance having a cabinet 14 defining at least one interior compartment 18, the cabinet 14 having a metal inner liner 22, a framed thermal break member 26 having four corner joinery elements 30 coupled to four side thermal breaks 34, and a cabinet face plate 38. The refrigerated appliance 10 also has a door 42 coupled to the cabinet 14 where the door 42 has a framed profile 46 having four corner joints 50 coupled to four side profiles 54, an inner panel 58, two or more ladders 62, a gasket 66, and an outer door panel 70.

Referring now to FIG. 1, the refrigerated appliance 10 has the cabinet 14 coupled to one or more doors 42, in particular, a refrigerator door 42a having a refrigerator handle 72 and a freezer door 42b having a freezer handle 76. The refrigerated appliance 10 depicted in FIG. 1 is a French door bottom mount refrigerator, but it will be understood that this disclosure may equally be applied to freezers, walk in coolers and the like, without departing from the teachings provided herein. The cabinet 14 has at least one interior compartment 18 and may have a refrigeration compartment 74 and a freezer compartment 78 while also having a refrigeration system 82.

The refrigeration system 82 cools the refrigeration compartment 74 and the freezer compartment 78. The refrigeration system 82 may comprise a known system including a compressor, condenser, expansion valve, evaporator, conduits, and other related components (not shown). Alternatively, the refrigeration system 82 may comprise thermoelectric components (not shown), or other suitable arrangements depending on the use.

Figure 2:
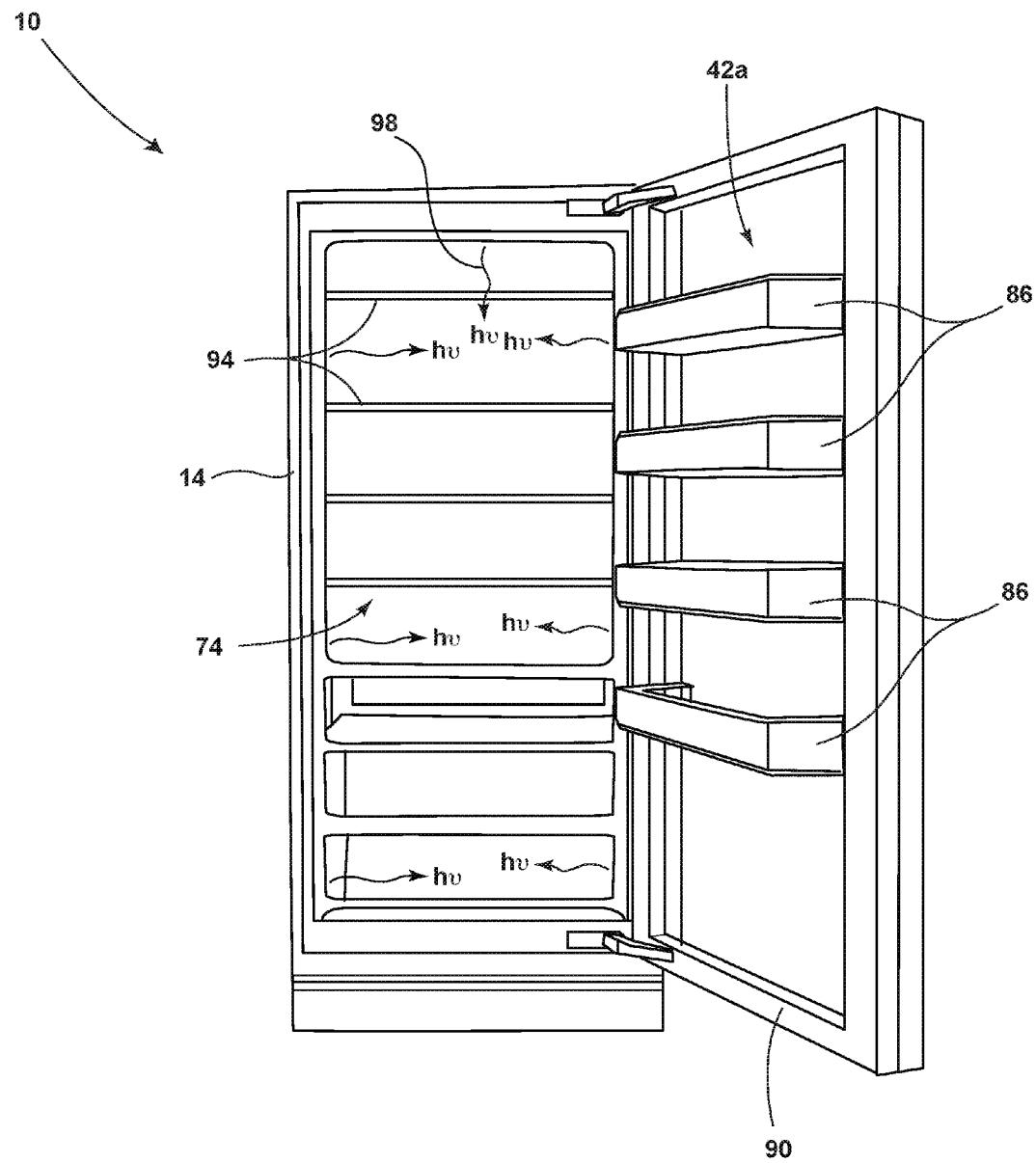
FIG. 2 is a front elevational view of a refrigerated appliance having a refrigeration compartment according to another aspect of the present disclosure.

Referring now to FIG. 2, the refrigerated appliance 10 displayed is an embodiment having only a refrigeration compartment 74 and a refrigerator door 42a. In some embodiments, the refrigerator door 42a has a one or more door dykes 86 and a door liner 90 running along the outside perimeter of the refrigerator door 42a. In other embodiments, the door 42a makes contact with the cabinet 14 with the framed profile 46 and gasket 66 (as shown in FIG. 1). The cabinet 14 encloses the refrigeration compartment 74 and has one or more shelves 94 placed horizontally in the cabinet 14. In some embodiments, light (hv) 98 may be projected towards the interior of the refrigeration compartment 74 from the LED light strip 166 (FIG. 9) coupled to the framed thermal break member 26 (FIG. 9) positioned at the inside edge of the cabinet 14.

Figure 3:
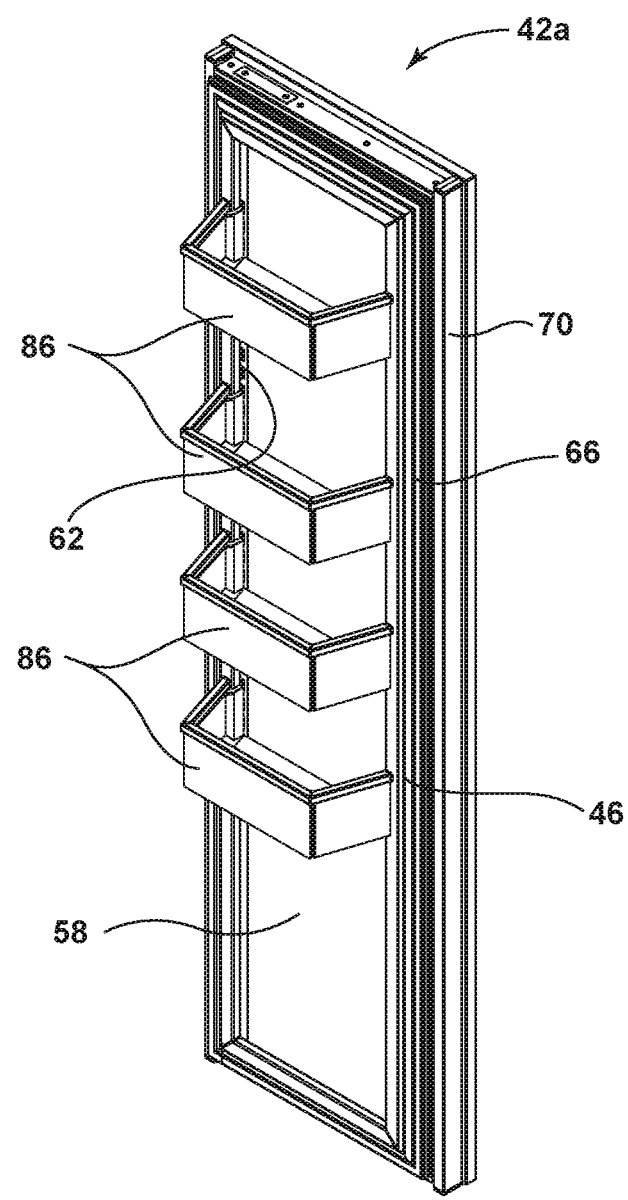
FIG. 3 is a perspective view of the refrigerator door assembly of FIG. 2 according to one aspect of the present disclosure.

Referring now to FIG. 3, one embodiment of the fully coupled refrigerator door 42a is shown having the outer door panel 70, the inner panel 58, the framed profile 46, the gasket 66, two ladders 62, and four door dykes 86 coupled together.

Figure 4:
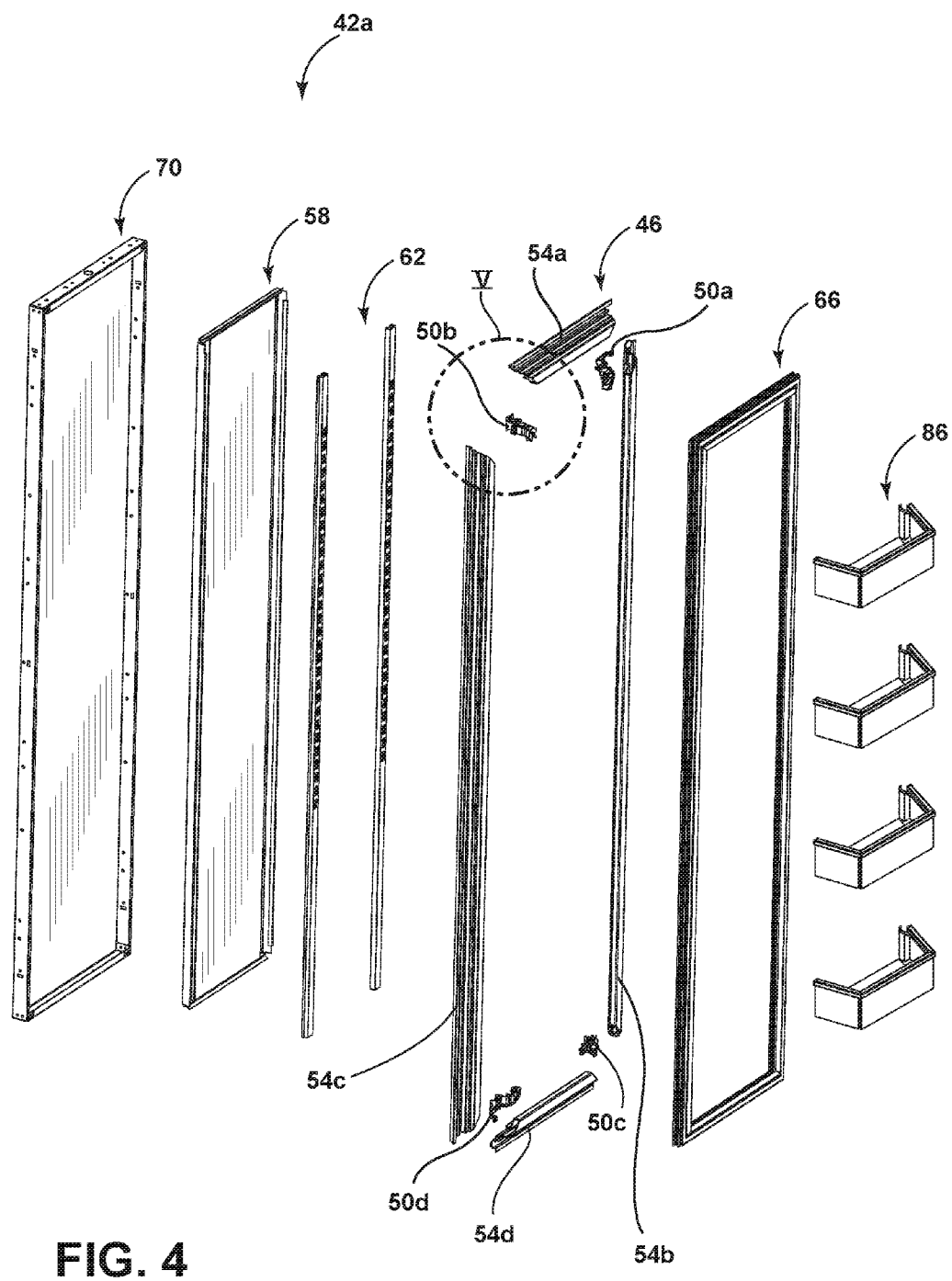
FIG. 4 is an exploded perspective view of one embodiment of a refrigerator door according to one aspect of the present disclosure.
Figure 5:
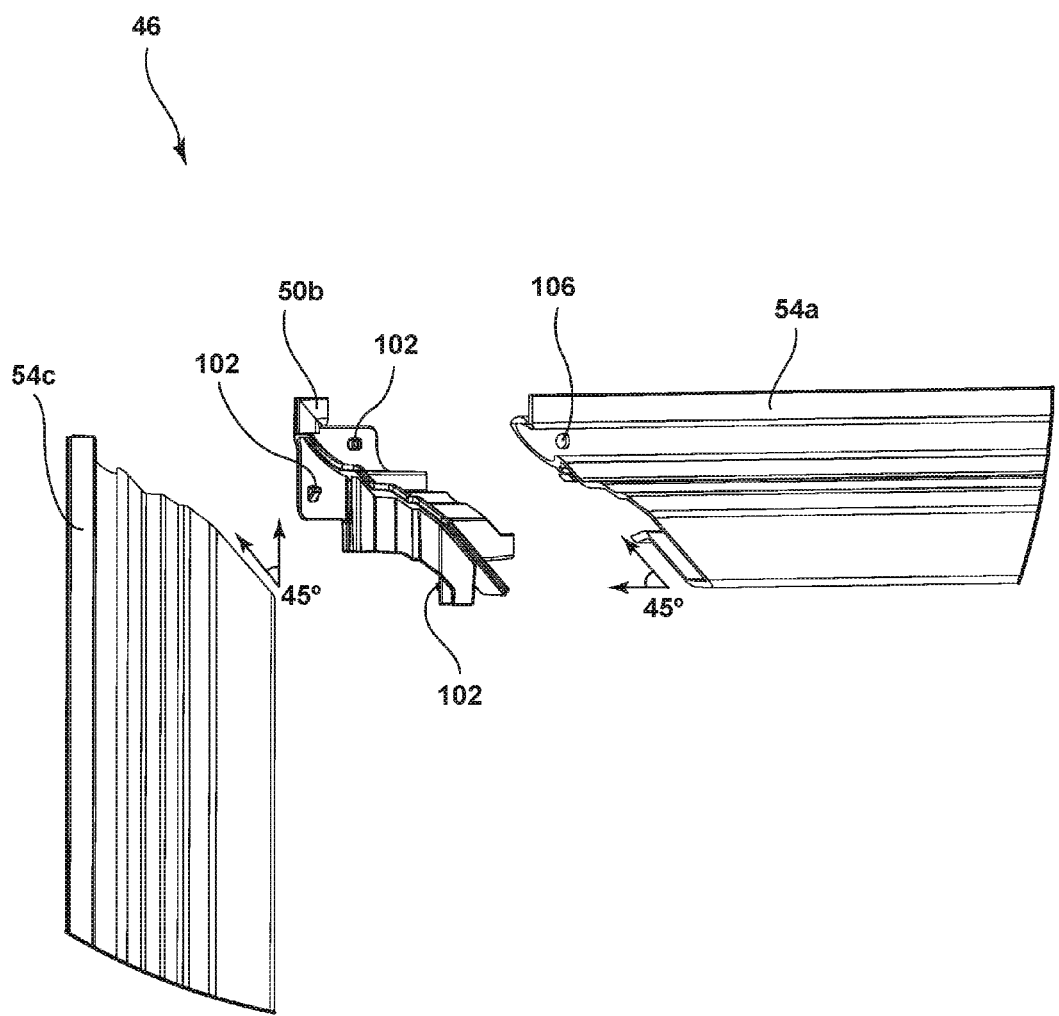
FIG. 5 is a partially schematic fragmentary view of a portion of the refrigerator door of FIG. 4 taken from the circled section labeled V.

Referring now to FIG. 4, an exploded view of one embodiment of the refrigerator door 42a of the refrigerated appliance 10 is shown. Beginning at the outside of the door 42a, the outer door panel 70 is coupled to the inner panel 58 and the framed profile 46. In some embodiments, the ladders 62 are recessed in the door 42 for visual concealment and the ladder 62 is positioned within the framed profile 46 and the inner panel 58. In other embodiments, the ladder 62 is positioned within the framed profile 46 and the inner panel 58 for visual concealment, and wherein the ladder 62 is formed from an extruded aluminum. The framed profile 46 has four side profiles 54 connected to four corner joints 50 (as shown in FIG. 5). The side profiles 54 include and refer to a top side profile 54a, a left side profile 54b, a right side profile 54c, and a bottom side profile 54d. The framed profile 46 is then coupled to the gasket 66 and lastly the door dykes 86 are coupled through the ladders 62 of the inner door 42.

The door dykes 86, the gasket 66, the framed profile 46, the ladder 62, the inner panel 58 and, outer door panel 70, of the door 42 can be made from a sheet metal, a thermoplastic polymer material, a thermoset polymer material, or any other suitable material known to one skilled in the art. In some embodiments, the ladder 62 is formed from an extruded aluminum and the framed profile 46 and/or door dykes 86 are extruded from a polyvinyl chloride, polyvinyl chloride, polycarbonate or polyester. In some embodiments, the inner panel 58 is formed from a pre-painted metal sheet.

Referring now to FIG. 5, the top corner section of the framed profile 46 labeled V in FIG. 4 is shown. The corner of the framed profile 46 has the top side profile 54a and the right side profile 54c coupled to the corner joint 50 through a snapping connection made of a snap 102 and a pierced hole 106 of the side profiles 54 and the corner joint 50. In some embodiments, the corner joints 50 are coupled to the side profiles 54 with the snap 102 and the pierced hole 106 while the side profiles 54 have two ends each having a 45° angle.

Figure 6:
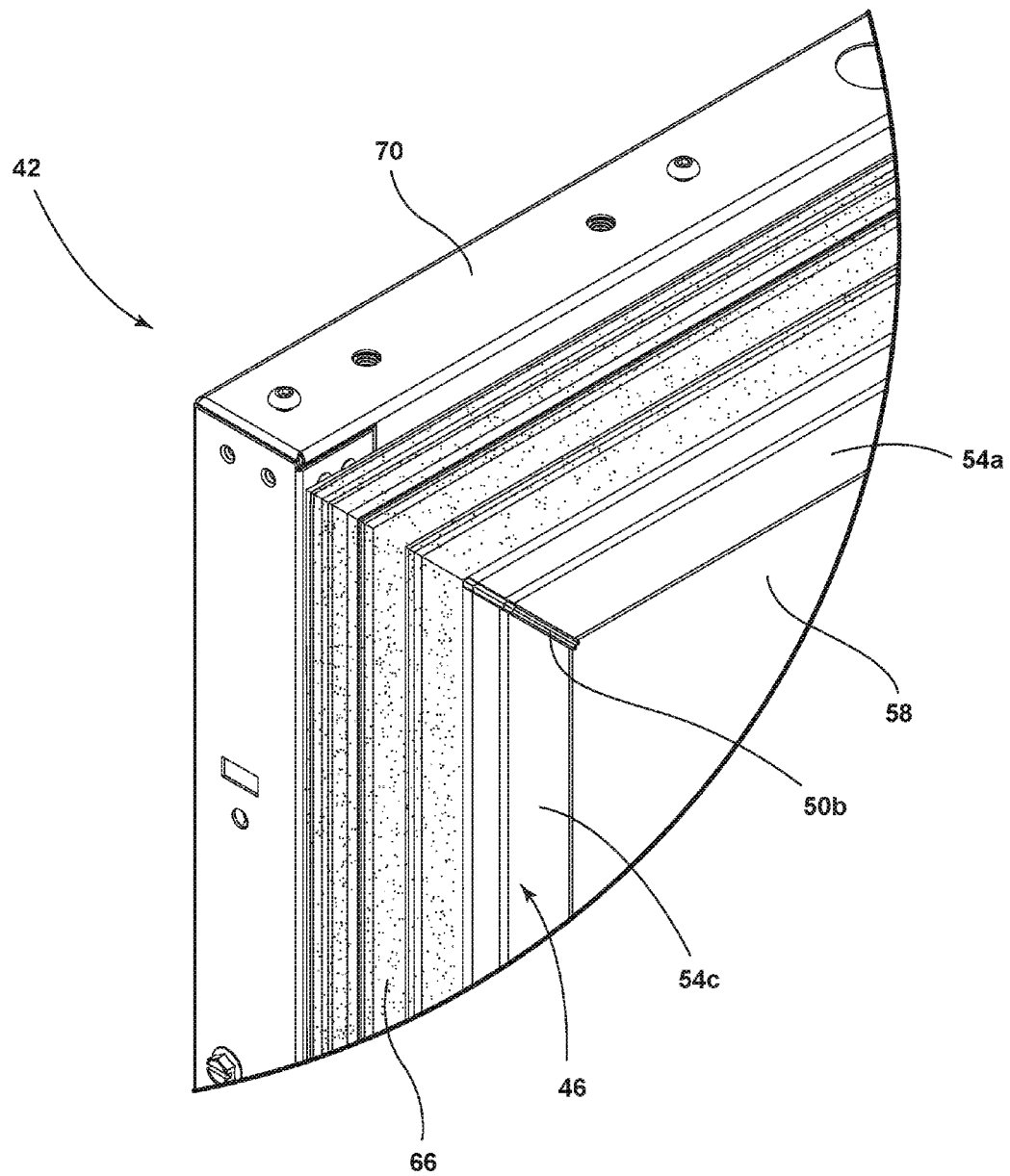
FIG. 6 is a rear partial perspective view of a refrigerator door according to one aspect of the present disclosure.

Referring now to FIG. 6, an assembled top corner section in one embodiment of the door 42 is shown. The outer door panel 70 is coupled to the inner panel 58, framed profile 46, and gasket 66. The framed profile 46 surrounds the inner panel 58 and the gasket 66 frames in the side profiles 54 and corner joints 50 of the framed profile 46.

Figure 7:
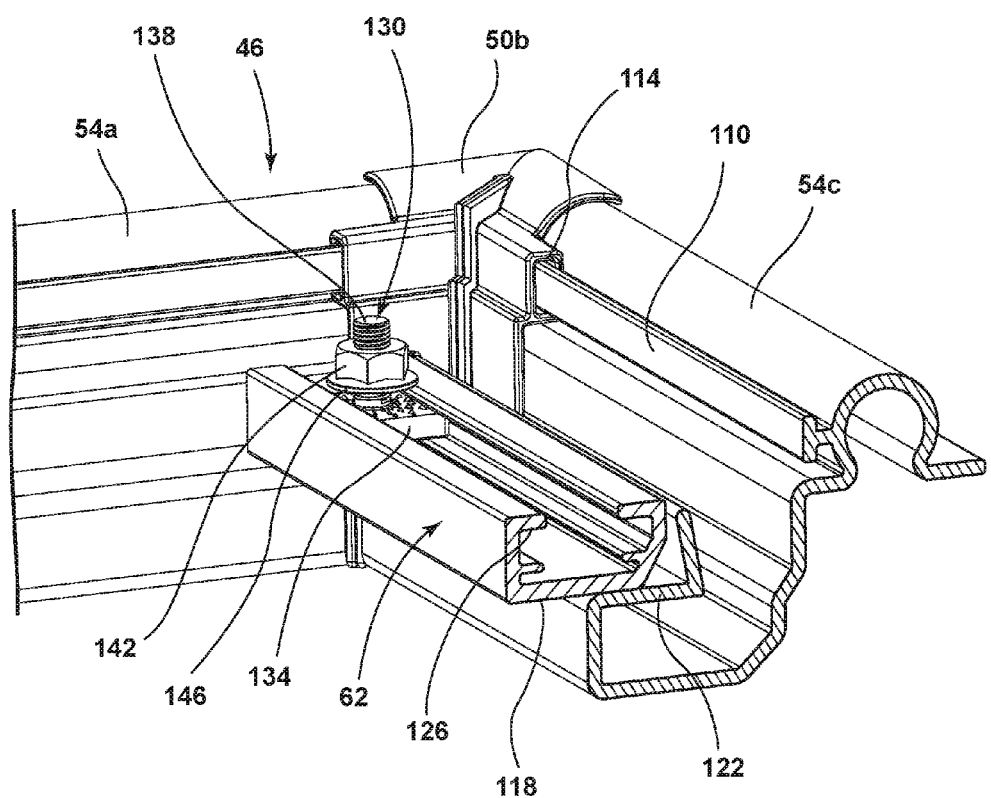
FIG. 7 is a rear partially schematic fragmentary view of a portion of a refrigerator door corner according to one aspect of the present disclosure.

Referring now to FIG. 7, a corner section of the framed profile 46 is shown. The corner joint 50b couples the top side profile 54a and the left side profile 54c through the insertion of an attachment strip 110 of the side profiles 54 into a receiving member 114 of the corner joint 50. A ladder face 118 of the ladder 62 is positioned against a profile flange 122 and coupled with a first fastener 130 and a fastener plate 134. The fastener plate 134 is positioned inside a ladder edge 126 and is coupled with the first fastener 130. The first fastener 130 may be any fastener known in the art and is shown in the example in FIG. 7 as a bolt 138 coupled with a washer 146 and a nut 142.

Figure 8:
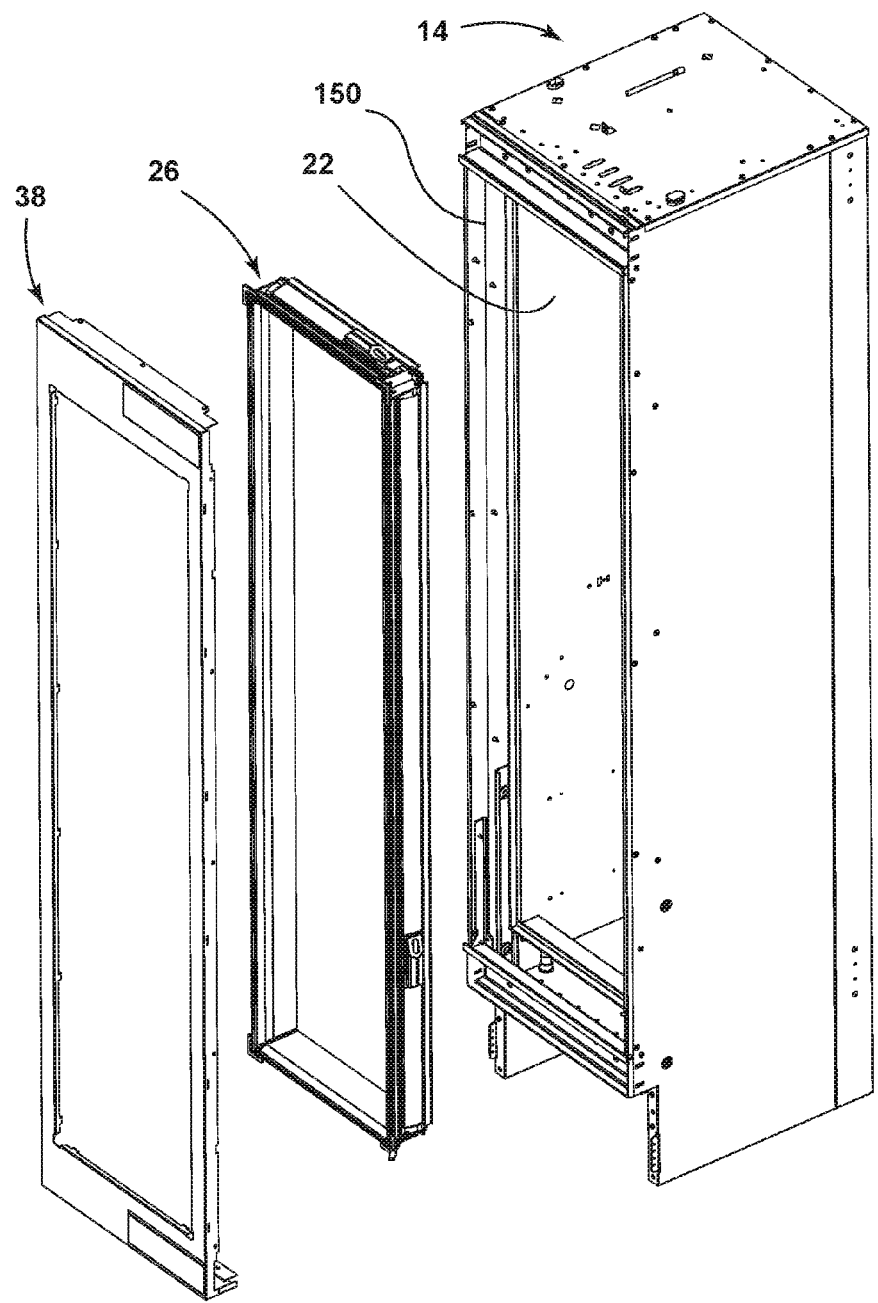
FIG. 8 is an exploded perspective view of a refrigeration cabinet according to one aspect of the present disclosure.

Referring now to FIG. 8, the cabinet 14 is shown in an exploded form to visualize the coupling of the cabinet face plate 38, the framed thermal break member 26, and the metal inner liner 22 of the cabinet frame 150. The cabinet 14 of the refrigerated appliance 10 may be varied depending on the use or desired functionality. In some embodiments, the cabinet 14 may have one or more interior compartments 18, for example, one refrigeration compartment 74 and one freezer compartment 78 (as shown in FIG. 1).

The cabinet face plate 38, the framed thermal break member 26, and the metal inner liner 22 of the cabinet frame 150 can be made from a sheet metal, a thermoplastic polymer material, a thermoset polymer material, or any other suitable material known to one skilled in the art. In some embodiments, the cabinet face plate 38 is formed from steel and the framed thermal break member 26 is extruded from a polyvinyl chloride, a polycarbonate and/or a polyester. In some embodiments, the cabinet face plate 38 and/or the metal inner liner 22 is formed from a pre-painted metal sheet.

Figure 9:
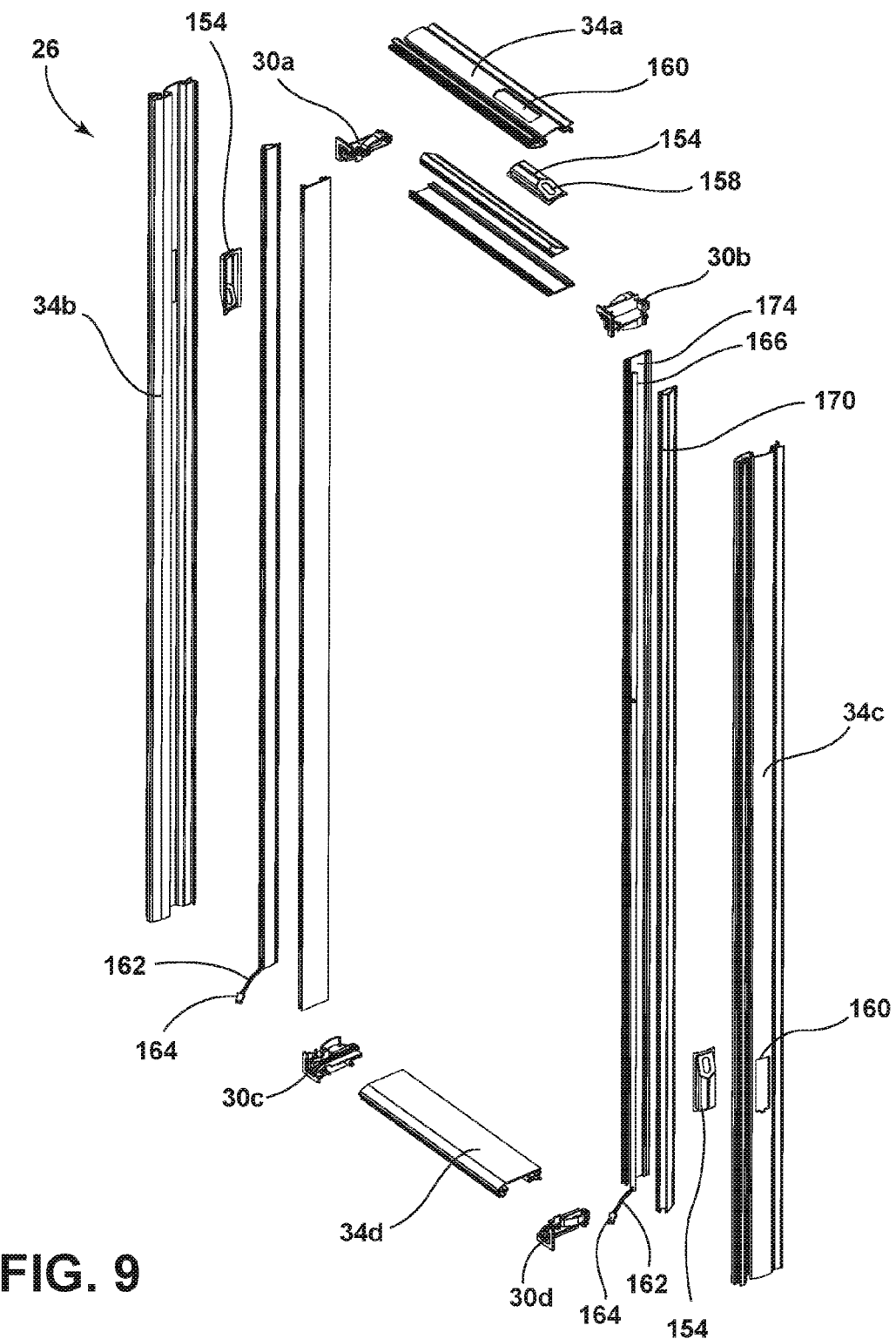
FIG. 9 is an exploded perspective view of a framed thermal break member of FIG. 8 according to one aspect of the present disclosure.

Referring now to FIG. 9, an exploded view of the framed thermal break member 26 is shown. The framed thermal break member 26 has four corner joinery elements 30 coupled to four side thermal breaks 34. The four corner joinery elements 30 are made up of a top left corner joinery element 30a, a top right corner joinery element 30b, a bottom left corner joinery element 30c, and a bottom right corner joinery element 30d. The four side thermal breaks or side thermal break members 34 are made of a top thermal break member 34a, a left thermal break member 34b, a right thermal break member 34c, and a bottom thermal break member 34d. Coupled to the inside of the side thermal breaks 34 are a wiring support member 154 having a wiring support member opening 158. One or more electrical wires 162 may run through the inside of the side thermal breaks 34 and pass through the wiring support member opening 158 and be coupled to a LED plug 164. A LED light strip 166 is coupled with a LED support strip 170 which is coupled to an elongated lens structure 174 where the elongated lens structure 174 couples to the inside edge of the side thermal breaks 34. A thermal break opening 160 in combination with the LED light strip 166, LED support strip 170, and elongated lens structure 174 may be coupled to any combination of side thermal breaks 34 but in some embodiments, for example, are coupled to the top thermal break member 34a, the left thermal break member 34b, and right thermal break member 34c. In some embodiments, a perimeter LED light strip 166 is coupled to the framed thermal break member 26.

Figure 10:
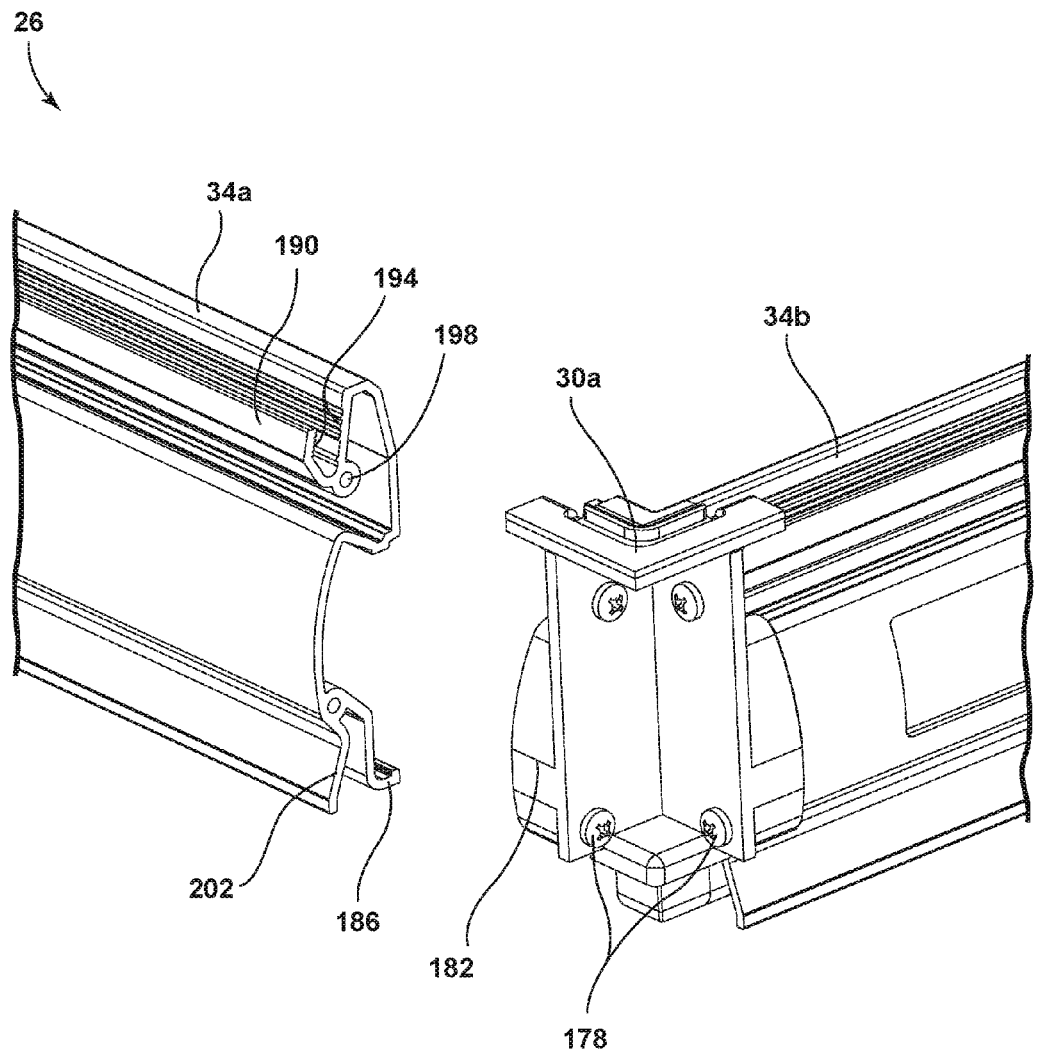
FIG. 10 is a partially schematic fragmentary rear view of a corner of a framed thermal break member according to one aspect of the present disclosure.

Referring now to FIG. 10, a corner section of the framed thermal break member 26 is shown. The top left corner joinery element 30a is coupled to both the top thermal break 34a and the left thermal break 34b with a second fastener 178 and a corner joinery receiving member 182. The side thermal breaks 34 are shown to have a first elongated hook member 186 and a second elongated hook member 190 wherein both elongated hook members 186, 190 have a serrated surface 194. The second fastener 178 of the top left corner joinery element 30a couples into the fastener void 198 of the side thermal break 34a. An attachment member 202 extends off the opposite side of the side thermal break 34 of the first elongated hook member 186. In some embodiments, the corner joinery elements 30 of the framed thermal break member 26 have the receiving member 182 and the second fastener 178 to couple the side thermal breaks 34 having an inserting member 206 (FIG. 11) and a fastener void 198.

Figure 11:
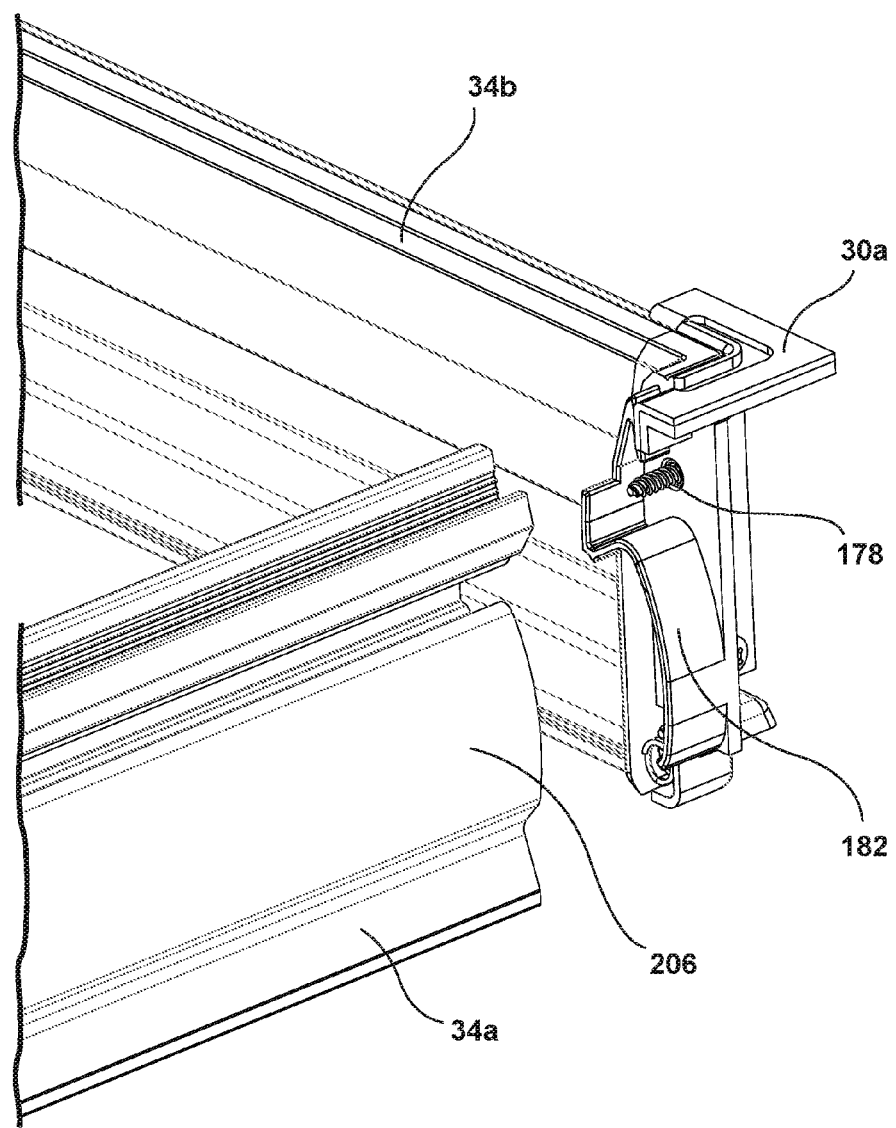
FIG. 11 is a partially schematic fragmentary side rear view of a corner of a framed thermal break member according to one aspect of the present disclosure.

Referring now to FIG. 11, the top left corner joinery element 30a is coupled to the side thermal breaks 34a, 34b with an inserting member 206 of the side thermal breaks 34a, 34b being positioned within a receiving member 182 of the top left corner joinery element 30a. The second fastener 178 is coupled to the fastener void 198 (FIG. 10).

Figure 12:
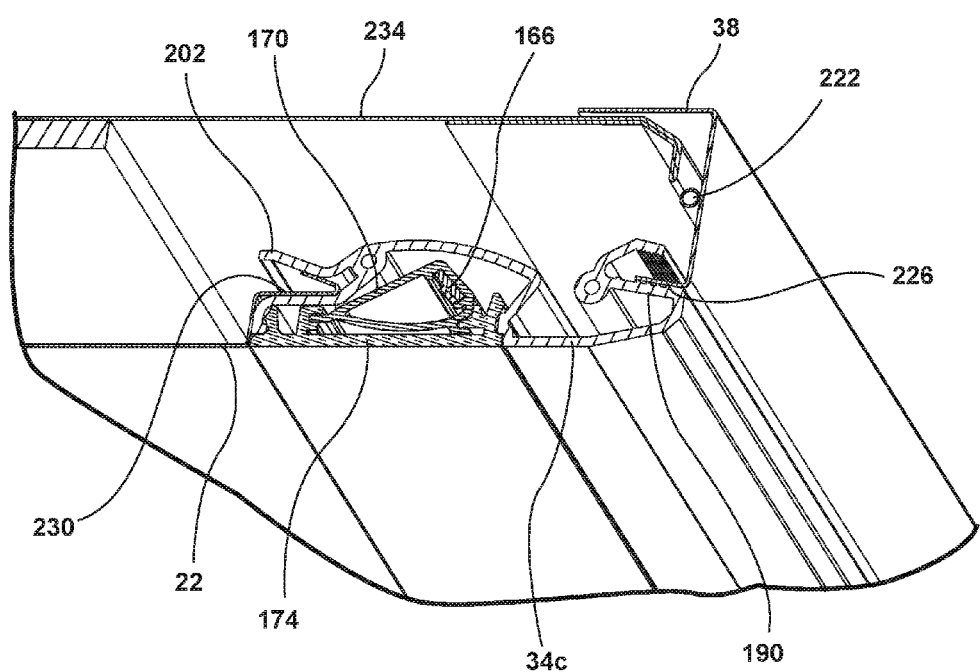
FIG. 12 is a partially schematic fragmentary cross-sectional view of a portion of a refrigerator cabinet according to one aspect of the present disclosure.

Referring now to FIG. 12, a partially schematic fragmentary cross-sectional view of a portion of the cabinet 14 is shown. The right thermal break 34c is coupled to the elongated lens structure 174 containing the LED light strip 166 attached to the LED support strip 170. The cabinet face plate 38 is coupled to the right thermal break 34c through a face plate flange 226 positioned against the serrated surface 194 (FIG. 10) of the second hook member 190. A heat tube 222 is positioned on the inside surface of the cabinet face plate 38 to prevent condensation on the surface. The metal inner liner 22 is coupled to the right thermal break 34c through a flange member 230 positioned between the attachment member 202 and the first elongated hook member 186 (FIG. 10) of the right thermal break 34c. A cabinet wrapper 234 is shown positioned against the cabinet face plate 38 to form an outside edge of the cabinet 14. In some embodiments, the framed thermal break member 26 (FIG. 8) is coupled to a LED light strip 166 with an elongated lens structure 174, and wherein the elongated lens structure 174 may be snappedly coupled to the framed side thermal break 26.

Figure 13:
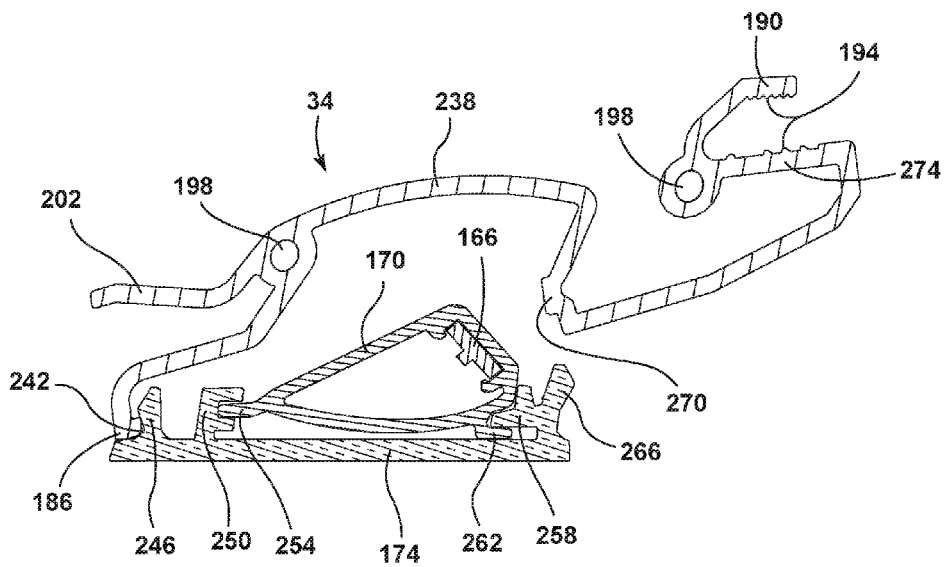
FIG. 13 is a partially schematic fragmentary cross-sectional view of a portion of a framed thermal break member according to one aspect of the present disclosure.
Figure 14:
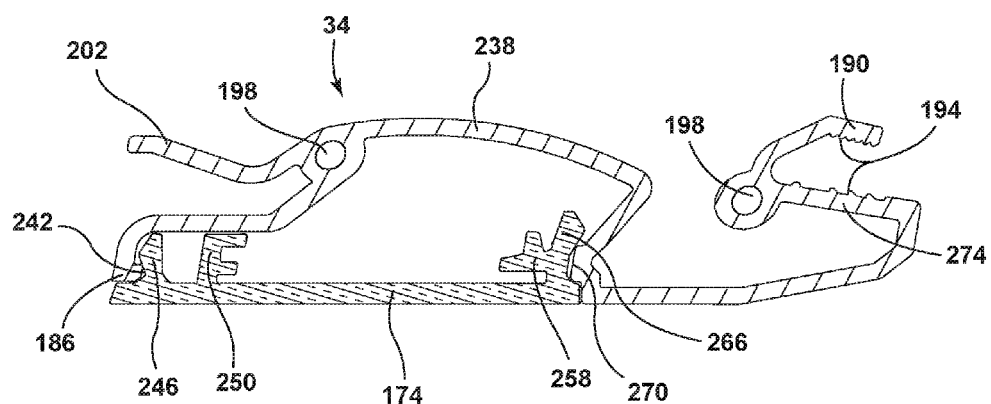
FIG. 14 is a partially schematic fragmentary cross-sectional view of a portion of a framed thermal break member according to one aspect of the present disclosure.

Referring now to FIGS. 13-14, a cross-sectional view of the side thermal break 34 is shown. The side thermal break 34 has a transition portion 238 connected to the attachment member 202 with the fastener void 198 positioned therebetween. The first elongated hook member 186 has a first attachment feature 242 that couples to a first clip member 246 to form a linkage between the elongated lens structure 174 and the side thermal break 34. The LED support strip 170 is connected to the elongated lens structure 174 through a first receiving member 250 coupled to a first leg 254 and a second receiving member 258 coupled to a second leg 262. The elongated lens structure 174 is further positioned into the side thermal break 34 through a second clip member 266 coupled to a second attachment feature 270 on the side thermal break 34. The second elongated hook member 190 is positioned across from a retaining portion 274 with the fastener void 198 connected therebetween. Upon coupling of the elongated lens structure 174 to the side thermal break 34, the LED light strip 166 can project light out through the LED support strip 170 and the elongated lens structure 174 to direct light (hv) 98 into the refrigeration compartment 74 or freezer compartment 78 of the cabinet 14 in the refrigerated appliance 10 (FIG. 1). In some embodiments, the side thermal breaks 34 have the attachment member 202 to couple with the flange member 230 of the metal inner liner 22 (FIG. 12), and wherein the elongated lens structure 174 having the LED light strip 166 coupled to the LED support strip 170 is coupled to the side thermal break 34 with the first and second clip member 246, 266.

Figure 15:
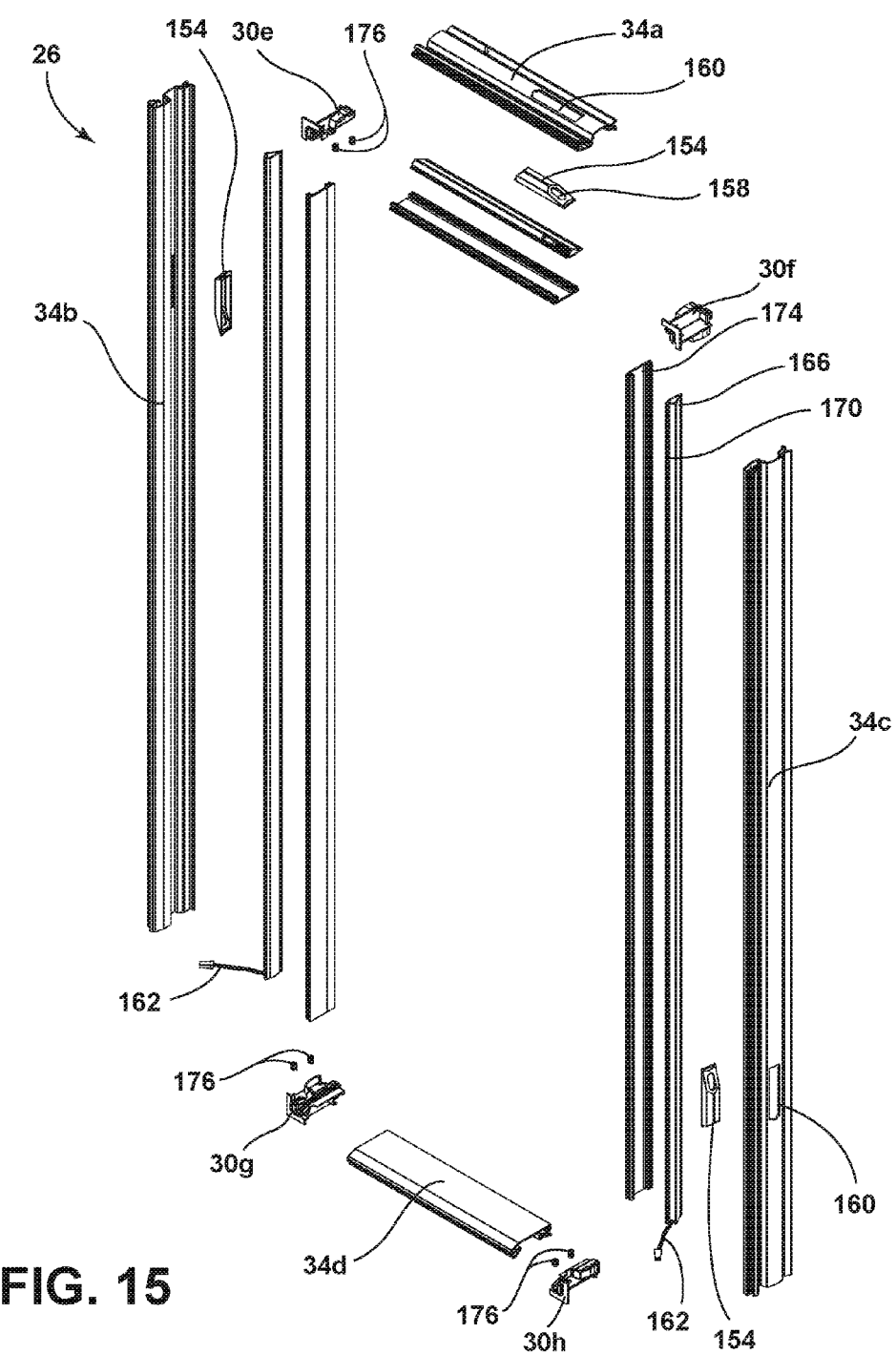
FIG. 15 is an exploded perspective view of a framed thermal break member of FIG. 8 according to another aspect of the present disclosure.

Referring now to FIG. 15, an exploded view of an alternate embodiment of the framed thermal break member 26 is shown. Similar to the embodiment shown in FIG. 9, the framed thermal break member 26 has four corner joinery elements 30 coupled to four side thermal breaks 34. The four corner joinery elements 30 are made up of a top left corner joinery element 30e, a top right corner joinery element 30f, a bottom left corner joinery element 30g, and a bottom right corner joinery element 30h. In the embodiments represented by the corner joinery elements 30 shown in FIG. 15, each corner joinery element 30e-30f provides a pocket 180 (FIG. 16) that the elongated lens structure 174 is coupled into in order to avoid spaces or gaps that would otherwise be present in the corner joinery element 30 at the ends of the elongated lens structure 174.

In some embodiments, the elongated lens structure 174 may have a length that is greater than the length of the respective side thermal breaks 34 it is coupled to that connects the two respective corner joinery elements 30. In addition, the elongated lens structure 174 may have a length that is greater than the distance from the corner joinery element's 30 geometry overlapping the elongated lens structure 174 at one end, to the corner joinery element's 30 geometry overlapping the elongated lens structure 174 at its opposite end. In some embodiments of the framed thermal break member 26, the top left 30e, bottom left 30g, and bottom right 30h corner joinery elements (as determined by facing the front of the refrigerated appliance 10) are each designed to have a pair of coil springs 176 that are coupled to the elongated lens structure 174 to manage the respective elongated lens structure's 174 position. The pair of coil springs 176 may constantly apply a spring force to the elongated lens structure 174 so that the elongated lens structure 174 can be constantly pushed away from the pair of coil springs 176 against a hard stop provided by the opposing corner joinery element 30. In some embodiments, the elongated lens structure 174 is coupled to the pair of coil springs 176 in the pocket 180 of the corner joinery elements 30. In other embodiments, the elongated lens structure 174 may be removed from its respective side thermal break 34 by pushing the elongated lens structure 174 against the pair of coil springs 176 to pull the opposing end of the elongated lens structure 174 out away from the respective side thermal break 34.

Figure 16:
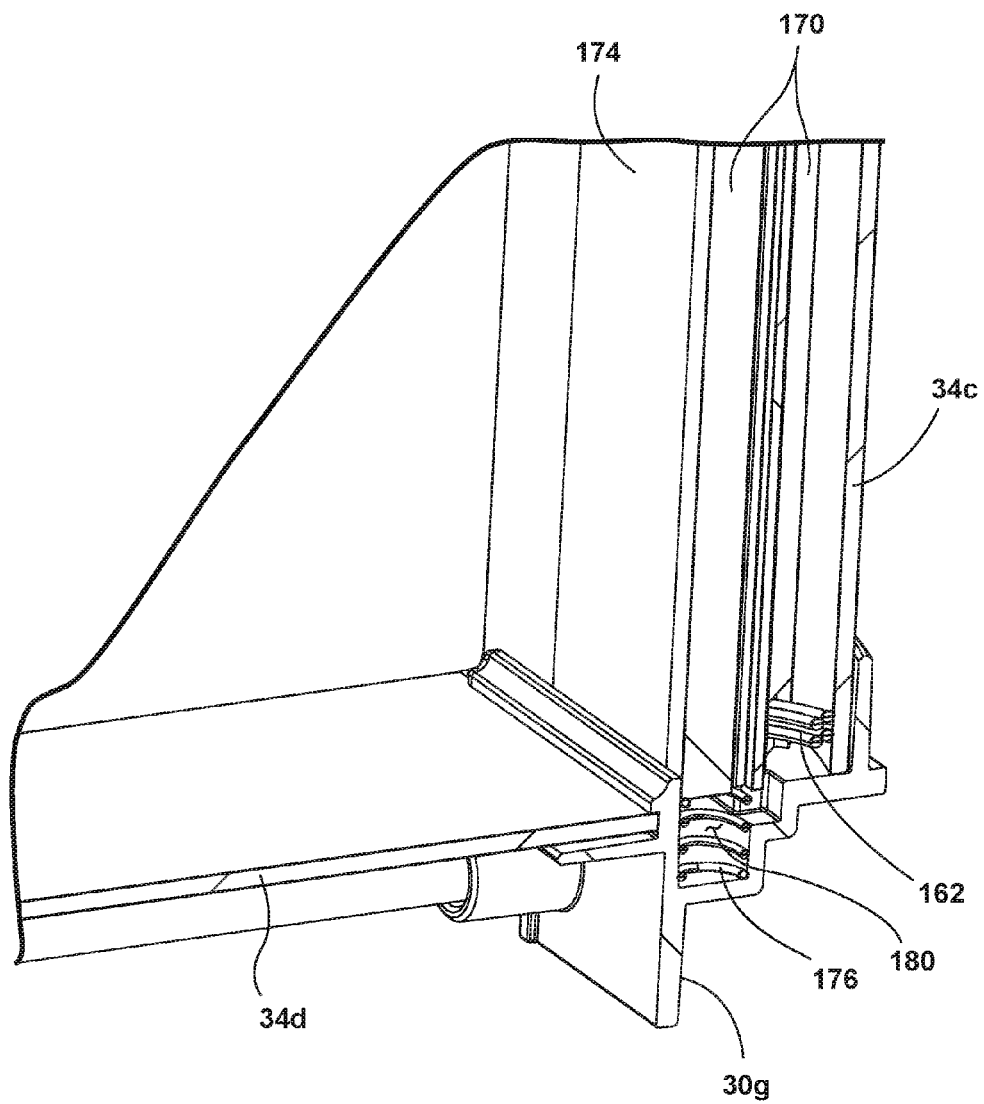
FIG. 16 is a partially schematic fragmentary cross-sectional view of a portion of a corner of a framed thermal break member with LED lighting according to one aspect of the present disclosure.
Figure 17:
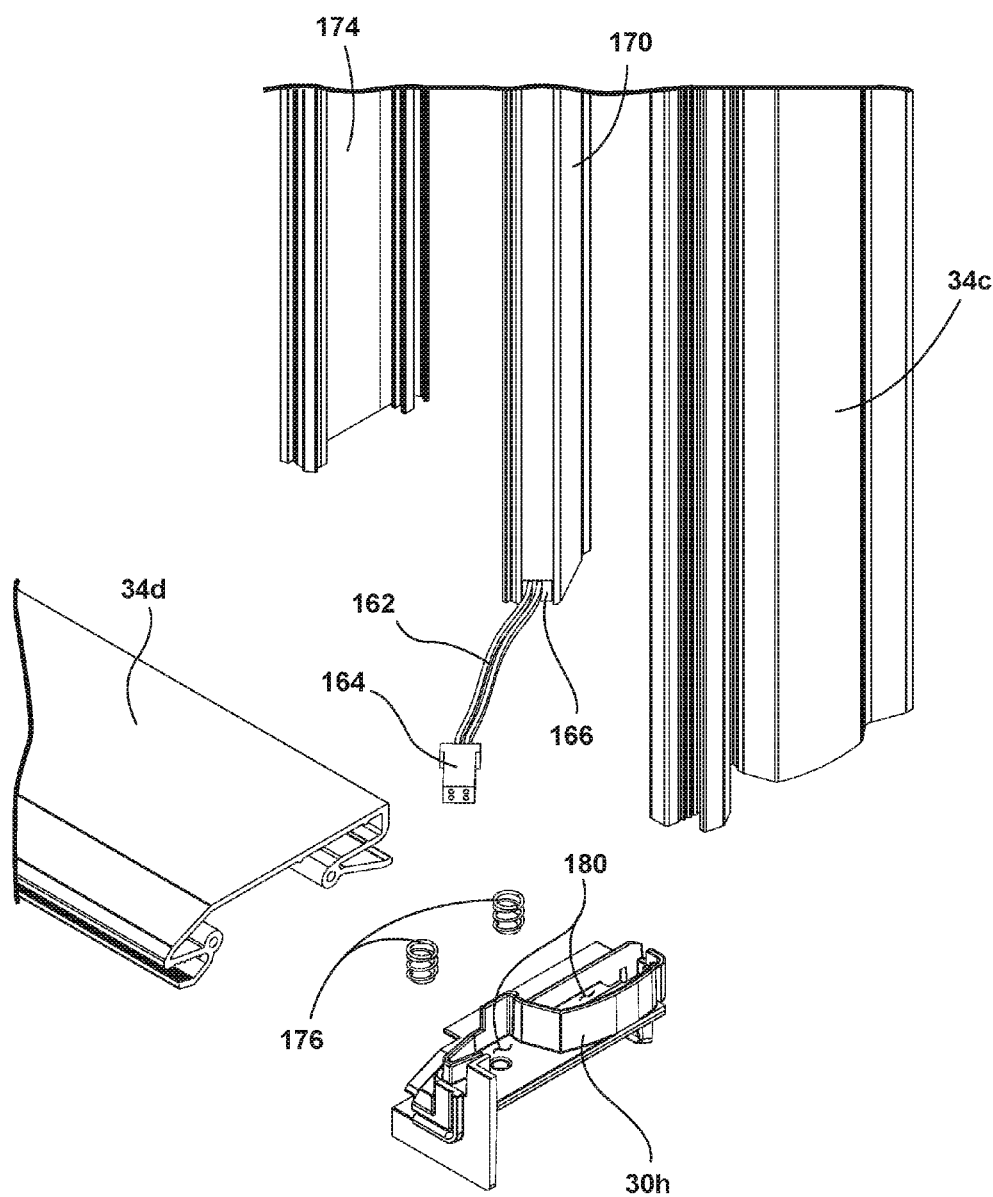
FIG. 17 is an exploded perspective view of a corner of a framed thermal break member according to one aspect of the present disclosure.
Figure 18:
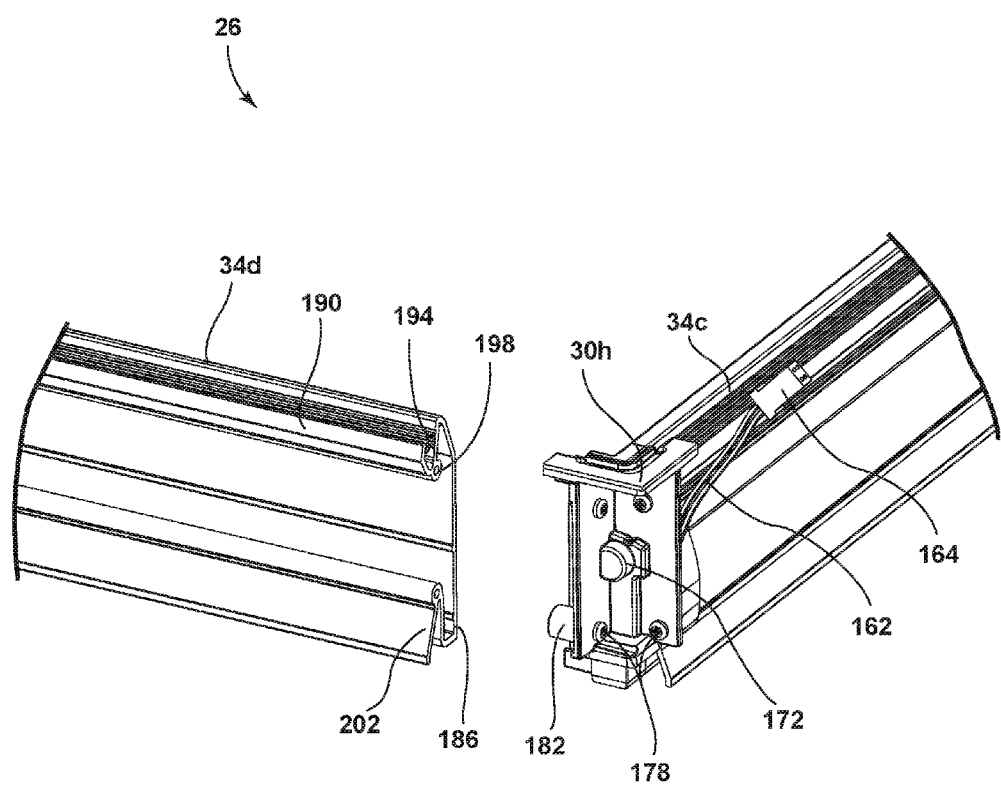
FIG. 18 is a partially schematic fragmentary rear view of a corner of a framed thermal break member according to one aspect of the present disclosure.

Referring now to FIGS. 16 to 18, FIG. 16 shows a cross-sectional view of a portion of the bottom left corner joinery element 30g showing the pocket 180 that pushes against the elongated lens structure 174 into the opposing hard stop of the top left corner joinery element 30e (FIG. 15). FIG. 17 shows an exploded perspective view of the bottom right corner of the framed thermal break member 26. The bottom side thermal break 34d, which does not have LED lighting attached, is coupled to the bottom right corner joinery element 30h that has the pair of coil springs 176 coupled in the pocket 180 to push against the elongated lens structure 174 having the LED light strip 166 coupled with the LED support strip 170. The elongated lens structure 174 may be coupled to the inside edge of the respective side thermal breaks 34. FIG. 18 is similar to the embodiment shown in FIG. 10 but is shown in this embodiment with a spring receiving member 172 that provides a hollow area to couple at least one of the coil springs 176.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A refrigerated appliance comprising:
    a cabinet defining at least one interior compartment, the cabinet comprising:
        a metal inner liner;
        a framed thermal break member having four corner joinery elements coupled to four side thermal breaks; and
        a cabinet face plate;
    a door coupled to the cabinet, the door comprising:
        a framed profile having four corner joints coupled to four side profiles;
        an inner panel;
        two or more ladders;
        a gasket; and
        an outer door panel;
    wherein the framed thermal break member is coupled to the metal liner and the cabinet face plate, and wherein the framed profile is coupled to the inner panel, two or more ladders, the gasket, and the outer door panel; and
    wherein the framed thermal break member is coupled to a LED light strip with an elongated lens structure, and wherein the elongated lens structure is coupled to one or more coil springs in a pocket of the corner joinery elements.

2. The refrigerated appliance of claim 1 further comprising:
    one or more door dykes wherein the door dykes and the framed thermal break member are extruded from a polyvinyl chloride, a polycarbonate, or a polyester.

3. The refrigerated appliance of claim 1, wherein the corner joints are coupled to the side profiles with a snap, and wherein the side profiles have two ends having a 45° angle.

4. The refrigerated appliance of claim 1, wherein the elongated lens structure is snappedly coupled to the side thermal breaks.

5. The refrigerated appliance of claim 1, wherein the ladder is positioned within the framed profile and the inner panel for visual concealment, and wherein the ladder is formed from an extruded aluminum.

6. The refrigerated appliance of claim 1, wherein the side thermal breaks have an attachment member to couple with a flange member of the metal inner liner, and wherein the elongated lens structure having the LED light strip coupled to a LED support strip is coupled to the side thermal breaks with a first and second clip member.

7. A refrigerated appliance comprising:
- a cabinet defining at least one interior compartment, the cabinet comprises a framed thermal break member coupled to a LED light strip with an elongated lens structure, wherein the elongated lens structure is coupled to at least one spring positioned in a pocket of a corner joinery element; and
- a door coupled to the cabinet, the door comprising:
  - a framed profile having four corner joints coupled to four side profiles;
  - an inner panel;
  - two or more ladders;
  - a gasket; and
  - an outer door panel;
- wherein the framed profile is coupled to the inner panel, two or more ladders, the gasket, and the outer door panel.

8. The refrigerated appliance of claim 7, wherein the corner joints are coupled to the side profiles with a snap.

9. The refrigerated appliance of claim 7, wherein the ladders are recessed in the door for visual concealment.

10. The refrigerated appliance of claim 9, wherein the ladder is positioned within the framed profile and the inner panel for visual concealment, and wherein the ladder is formed from an extruded aluminum.

11. The refrigerated appliance of claim 7 further comprising:
one or more door dykes wherein the door dykes are extruded from a polyvinyl chloride, a polycarbonate, or a polyester.

12. A refrigerated appliance comprising:
- a door; and
- a cabinet defining at least one interior compartment, the cabinet comprising:
  - a metal inner liner;
  - a framed thermal break member having four corner joinery elements coupled to four side thermal breaks; and
  - a cabinet face plate;
- wherein the framed thermal break member is coupled to the metal liner and the cabinet face plate and wherein the framed thermal break member is coupled to a LED light strip with an elongated lens structure, and wherein the elongated lens structure is coupled to at least one spring positioned in a pocket of the corner joinery elements.

13. The refrigerated appliance of claim 12, wherein the elongated lens structure is snappedly coupled to the side thermal breaks.

14. The refrigerated appliance of claim 12, wherein the metal liner is coupled to the thermal break members through a flange member positioned between an attachment member and a first elongated hook member of the thermal break member.

15. The refrigerated appliance of claim 12, wherein the corner joinery elements of the thermal break member have a receiving member and a second fastener to couple the side thermal breaks having an inserting member and a fastener void.

16. The refrigerated appliance of claim 12, wherein the side thermal breaks have an attachment member to couple with a flange member of the metal inner liner, and wherein the elongated lens structure having the LED light strip coupled to a LED support strip is coupled to the side thermal breaks with a first and second clip member.

* * * * *